US012568385B2

(12) United States Patent (10) Patent No.: US 12,568,385 B2
Tan et al. (45) Date of Patent: Mar. 3, 2026

(54) SURVIVAL TIME FOR QUALITY OF SERVICE REQUIREMENT RELAXATION

(71) Applicant: ZTE Corporation, Shenzhen (CN)

(72) Inventors: Jie Tan, Shenzhen (CN); Xiubin Sha, Shenzhen (CN); Bo Dai, Shenzhen (CN); Ting Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 489 days.

(21) Appl. No.: 17/808,425

(22) Filed: Jun. 23, 2022

(65) Prior Publication Data

US 2022/0330049 A1 Oct. 13, 2022

Related U.S. Application Data

(63) Continuation of application No. PCT/CN2020/106180, filed on Jul. 31, 2020.

(51) Int. Cl.
*H04W 24/02* (2009.01)
*H04L 1/1867* (2023.01)
*H04W 24/10* (2009.01)
*H04L 1/00* (2006.01)

(52) U.S. Cl.
CPC ............. *H04W 24/02* (2013.01); *H04L 1/188* (2013.01); *H04W 24/10* (2013.01); *H04L 1/0017* (2013.01)

(58) Field of Classification Search
CPC ..... H04W 24/02; H04W 24/10; H04W 28/24; H04L 1/0003; H04L 1/0009; H04L 1/1825; H04L 1/1864; H04L 1/188; H04L 1/1887; H04L 1/0017; H04L 43/067; H04L 43/0852; H04L 1/08; H04L 41/05; Y02D 30/70
See application file for complete search history.

(56) References Cited

U.S. PATENT DOCUMENTS

| | | | |
|---|---|---|---|
| 2018/0279168 | A1 | 9/2018 | Jheng et al. |
| 2019/0053041 | A1 | 2/2019 | Bergstrom et al. |
| 2020/0236579 | A1 | 7/2020 | Cho et al. |

(Continued)

FOREIGN PATENT DOCUMENTS

| | | |
|---|---|---|
| CN | 101053221 | 10/2007 |
| CN | 105656806 | 6/2016 |

(Continued)

OTHER PUBLICATIONS

CATT "K1 #X, New Sol: Use of survival time," 3GPP TSG-WG SA2 Meeting #139E Elbonia, Jun. 1-5, 2020, S2-2003921, 4 pages.

(Continued)

*Primary Examiner* — Shah M Rahman
(74) *Attorney, Agent, or Firm* — Perkins Coie LLP

(57) ABSTRACT

Methods, apparatus, and systems that use the survival time parameter to relax Quality of Service (QoS) reliability requirements in communication services are disclosed. In one example aspect, a wireless communication method includes triggering, by a wireless device, a report to a radio access node due to occurrence of a condition of a survival time associated with a communication service. The survival time represents an amount of time an application consuming the communication service is capable of continuing without receiving any anticipated message. The survival time can indicate a number of consecutive incorrectly received or lost packets.

20 Claims, 14 Drawing Sheets

1000

(56) References Cited

U.S. PATENT DOCUMENTS

| | | | | |
|---|---|---|---|---|
| 2020/0274654 A1* | 8/2020 | Loehr | .................... | H04W 72/23 |
| 2021/0218500 A1* | 7/2021 | Bhamri | ................. | H04W 72/21 |
| 2021/0235399 A1* | 7/2021 | Wich | ................ | H04W 28/0268 |
| 2021/0258110 A1* | 8/2021 | Brahmi | ................. | H04L 1/1896 |
| 2021/0288747 A1* | 9/2021 | Yu | .......................... | H04L 1/0003 |
| 2021/0337404 A1 | 10/2021 | Sun | | |
| 2021/0377793 A1* | 12/2021 | Moilanen | ............ | H04L 43/0847 |
| 2022/0053509 A1* | 2/2022 | Bulakci | ............ | H04W 28/0268 |
| 2022/0078873 A1* | 3/2022 | Belleschi | .............. | H04W 28/24 |
| 2022/0086861 A1* | 3/2022 | Zhao | ........................ | H04L 1/188 |
| 2022/0182185 A1* | 6/2022 | Bostrom | ............. | H04L 41/5009 |
| 2022/0224446 A1* | 7/2022 | Fan | ........................ | H04L 1/1812 |
| 2022/0263743 A1* | 8/2022 | Gebert | ................. | H04W 76/15 |
| 2022/0321249 A1* | 10/2022 | Fu | ..................... | H04W 28/0252 |
| 2023/0068462 A1* | 3/2023 | Moon | ................. | H04W 56/001 |
| 2023/0231655 A1* | 7/2023 | Yue | ........................ | H04L 1/1887 |
| | | | | 370/328 |
| 2023/0284077 A1* | 9/2023 | Pateromichelakis | ... | H04L 47/20 |
| | | | | 370/235 |
| 2023/0308229 A1* | 9/2023 | Kuo | .......................... | H04L 1/22 |

FOREIGN PATENT DOCUMENTS

| | | | |
|---|---|---|---|
| CN | 106488505 | | 3/2017 |
| CN | 108886498 | | 11/2018 |
| CN | 111327404 | | 6/2020 |
| CN | 111432440 | A | 7/2020 |
| JP | 2002354048 | A | 12/2002 |
| KR | 100876313 | B1 | 12/2008 |
| WO | 2018233451 | A1 | 12/2018 |
| WO | 2020089851 | A1 | 5/2020 |
| WO | 2020/119195 | | 6/2020 |
| WO | 2020/151641 | | 7/2020 |
| WO | WO-2021097637 | A1 * | 5/2021 ............. H04L 47/24 |

OTHER PUBLICATIONS

Co-pending EP Application No. 20947033.5 Extended Search Report mailed on Oct. 24, 2022 (9 pages).

Vodafone Group PLC., "Discussion on response to SA2 LS R2-1707652 on low latency," 3GPP TSG RAN WG2 Meeting #90, Berlin, Germany, 7 pages, Aug. 21-25, 2017.

International Search Report and Written Opinion International Application No. PCT/CN2020/106180, mailed on Apr. 25, 2021 (6 pages).

Lenovo, et al. "Details of Selective Duplication Procedure" 3GPP TSG-RAN WG2 Meeting #105bis R2-1904135, Xi'an, China, Apr. 8-12, 2019, 4 pages.

Co-pending CN Application No. 202080104441.X, Office Action mailed on May 17, 2024 (26 pages with unofficial English translation).

Co-pending ID Application No. P00202207056, Examination Report mailed on Sep. 25, 2024 (26 pages with unofficial English translation).

Co-pending CN Application No. 202080104441X, Notification to Complete formalities of Registration mailed on Nov. 1, 2024 (7 pages with unofficial English translation).

Co-pending Korean Application No. 10-2022-7021720, Office Action mailed on Oct. 22, 2024 (16 pages with machine translation).

Co-pending EP Application No. 20947033.5 Article 94 Communication mailed on Jan. 20, 2025 (5 pages).

Co-pending Korean Application No. 10-2022-7021720, Final Office Action mailed on Jun. 18, 2025 (16 pages with machine translation).

Samsung "The Need for survival time in TSC Assistance Information" 3GPP TSG-SA WG2 Meeting #132, Xi'an, China, Apr. 8-12, 2019, S2-1903640, 4 pages.

Apple "KI #5, New Sol: IIoT application specific AF providing survival time as part of the QoS container" SA WG2 Meeting #139E S2-2003752, Elbonia, Jun. 1-12, 2020, 4 pages.

Co-pending EP Application No. 20947033.5 Rule 71 Communication mailed on Apr. 23, 2025 (9 pages).

MOIP, Notice of Allowance for Korean Application No. 10-2022-7021720, mailed on Nov. 6, 2025, 8 pages with unofficial English translation.

Samsung et al., "Key issue on QoS Enhancement for Deterministic Applications in 5GS," SA WG2 Meeting #136, S2-1911960, Reno, USA, Nov. 18-22, 2019, 3 pages.

Samsung et al., "Key issue on QOS Enhancement for Deterministic Applications in 5GS," SA WG2 Meeting #136, S2-1911607, Reno, USA, Nov. 18-22, 2019, 3 pages.

Nokia et al., "KI#X, New Sol: Survival Time for Deterministic Applications," SA WG2 Meeting #139E, S2-2004329, Elbonia, Jun. 1-12, 2020, 5 pages.

Samsung, "The Need for survival time in TSC Assistance Information," 3GPP TSG-SA WG2 Meeting #133, S2-1905626, Reno, USA, May 13-17, 2019, 5 pages.

Vodafone, "New QCIs for Low Latency E-UTRAN and E-UTRAN-NR Dual Connectivity: action on reply LSs R1-1715089 and R2-1709976/S2-176871," 3GPP TSG SA WG2 Meeting #123, S2-177641, Ljubljana, Slovenia, Oct. 23-27, 2017, 14 pages.

* cited by examiner

200 triggering, by a wireless device, a report to a radio access node due to occurrence of a condition of a survival time associated with a communication service

210 receiving, by a radio access node, a report from a wireless device based on a condition associated with a survival time associated with a communication service

310

300

400

600

700

800

1100

SURVIVAL TIME FOR QUALITY OF SERVICE REQUIREMENT RELAXATION

CROSS-REFERENCE TO RELATED APPLICATION

This application is a continuation and claims priority to International Application No. PCT/CN2020/106180, filed on Jul. 31, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that use the survival time parameter that may be used by embodiments to relax Quality of Service (QoS) reliability requirements in communication services and to reconfigure or change existing connections according to conditions associated with the survival time.

In one example aspect, a wireless communication method is disclosed. The method includes triggering, by a wireless device, a report to a radio access node due to occurrence of a condition of a survival time associated with a communication service. The survival time represents an amount of time an application consuming the communication service is capable of continuing without receiving any anticipated message. The survival time can indicate a number of consecutive incorrectly received or lost packets.

In another example aspect, a wireless communication method is disclosed. The method includes receiving, by a radio access node, a report from a wireless device based on a condition associated with a survival time associated with a communication service.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Development in wireless communication technologies enables the ultra-reliable low-latency communication (URLLC) capabilities of 5G wireless systems, which allow operators and enterprises to address high-performance use cases such as industrial automation. However, stringent requirements for URLLC also impose challenges and in some cases relaxation of such requirements is desirable. To relax certain Quality of Service (QoS) requirements for reliability, a parameter referred to as survival time has been introduced into the application layer. The survival time may be, for example, an amount of time that an application consuming a communication service may continue without any anticipated message. That is, the survival time is a period of time in which losses of packets are tolerable for the packet data service. The survival time can be expressed as a time period or a maximum number of consecutive incorrectly received or lost message (e.g., for periodic/cyclic traffic).

Figure 1:
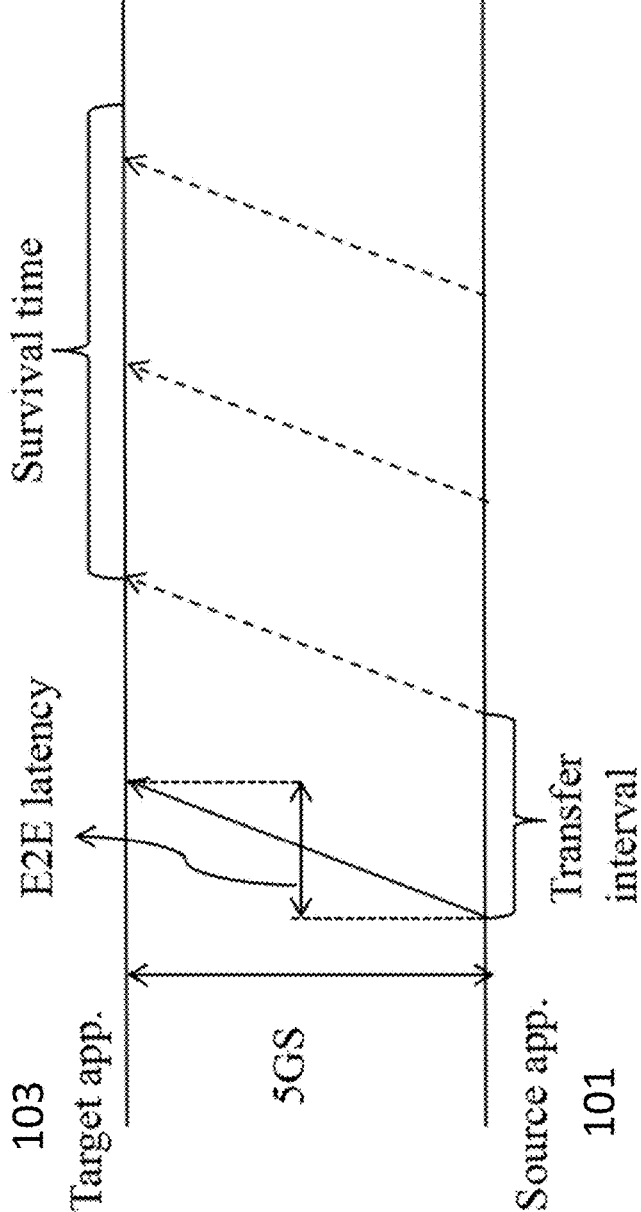
FIG. 1 illustrates an example scenario of using survival time in accordance with one or more embodiments of the present technology.

FIG. 1 illustrates an example scenario 100 of using survival time in accordance with one or more embodiments of the present technology. As shown in FIG. 1, the source application 101 sends packets to the target application 103 through the 5G System (5GS) in deterministic communication (e.g., periodic or aperiodic) that come with end-to-end latency and transfer interval. For example, a message from the source application needs to arrive in a timely manner at the target application. Only uncorrupted messages are accepted by the target application. The target application can start a timer is for its functions (e.g. an automation function). Upon expiration of the timer, the communication service for that function is declared "unavailable." Message loss within the survival time is tolerable so long as a message is delivered successfully (e.g., timely and uncorrupted) within the survival time. Thus, the QoS requirement on reliability can be relaxed with the use of the survival time.

This patent document discloses various techniques that can be implemented in wireless communication systems, e.g., on the access node or base station side, to effectively make use of the survival time, e.g., based on combining the survival time with Packet Delay Budget (PDBs) or the number of retransmissions allowed for a packet. The disclosed techniques allow the access nodes or the base stations to perform efficient resource allocation, e.g. increasing spectral efficiency by decreasing modulation and coding scheme or intentional discarding of certain messages that do not affect the QoS requirement. The disclosed techniques also allow either the base station or the User Equipment (UE) to initiate connection reconfiguration, cell reselection, and/or Packet Data Convergence Protocol (PDCP) Duplication should the current connection fails to meet the relaxed QoS requirements as indicated by the survival time.

Figure 2:
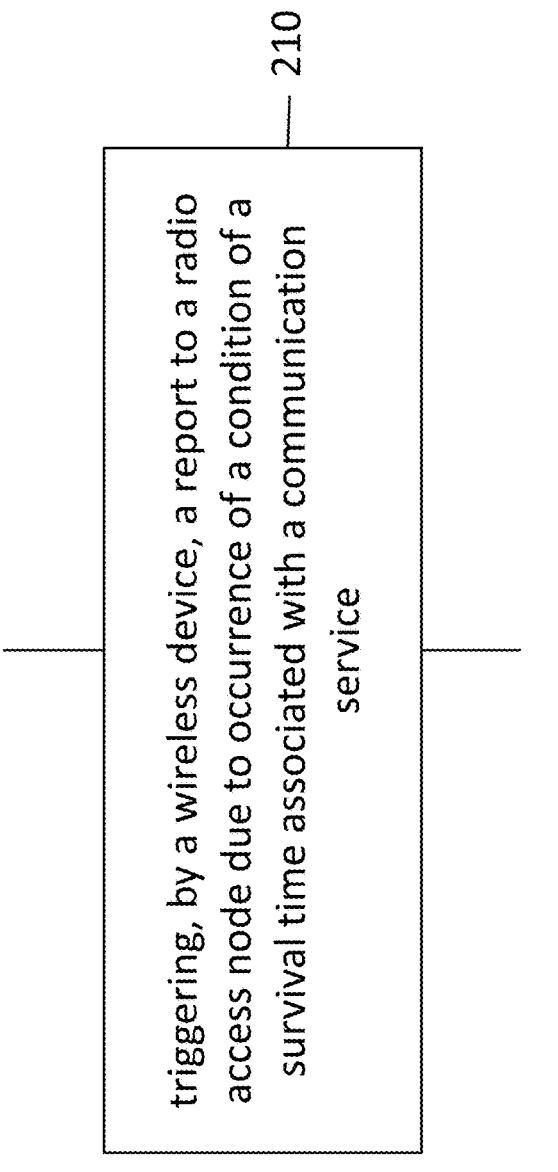
FIG. 2 is a flowchart of a method for wireless communication in accordance with one or more embodiments of the present technology.

FIG. 2 is a flowchart of a method for wireless communication 200 in accordance with one or more embodiments of the present technology. The method 200 includes, at operation 210, triggering, by a wireless device, a report to a radio access node due to occurrence of a condition of a survival time associated with a communication service. The survival time represents an amount of time an application consuming the communication service is capable of continuing without receiving any anticipated message. The survival time can indicate a number of consecutive incorrectly received or lost packets.

In some embodiments, determining the survival time comprises examining a PDB associated with the radio access node, which will be discussed in detail in Embodiments 2 and 3. Here, the PDB indicates an upper limit of a delay suffered by a packet.

In some embodiments, determining the survival time comprises examining a packet retransmitted up to a maximum number of retransmissions, which will be discussed in detail in Embodiments 4 and 5. In some embodiments, the method also includes determining, based on a packet header in a previous packet, an association between a currently transmitted packet and other packets.

In some embodiments, the survival time is represented using a survival time counter, and the condition specifies that the report is triggered in case the survival time counter reaches or exceeds a threshold. In some embodiments, the survival time is represented using a survival time timer, and the condition specifies that the report is triggered in case the survival time timer expires, or the survival time timer reaches or exceeds a threshold. In some embodiments, the threshold comprises at least one of: (1) a value of one (e.g., each time the counter is incremented), (2) a value defined by the wireless device, (3) an allowable number of consecutive packet losses, or (4) a percentage value. In some embodiments, the method includes receiving, by the wireless device, the threshold from the radio access node.

In some embodiments, the report comprises information at least one of: a service quality improvement indicator associated with the survival time, a performance index associated with the survival time, a status indication associated with the survival time, a counter value associated with the survival time, a service identifier for the communication service, a request associated with the survival time, a message associated with the survival time, or a timer value associated with the survival time.

In some embodiments, the method includes triggering, by the wireless device, a cell reselection procedure based on the condition associated with the survival time. In some embodiments, the method includes triggering, by the wireless device, an activation of a PDCP Duplication process based on the condition associated with the survival time. These features will be discussed in detail in Embodiment 8.

In some embodiments, the method includes switching, by the wireless device, from a current logical channel having a first priority to a second logical channel having a second priority based on the condition associated with the survival time. In some embodiments, the method includes switching, by the wireless device, a first priority to a second priority of a current logical channel based on the condition associated with the survival time. In some embodiments, the method includes selecting, by the wireless device, the second priority based on the condition associated with the survival time. These features will be discussed in detail in Embodiments 9 and 10.

Figure 3:
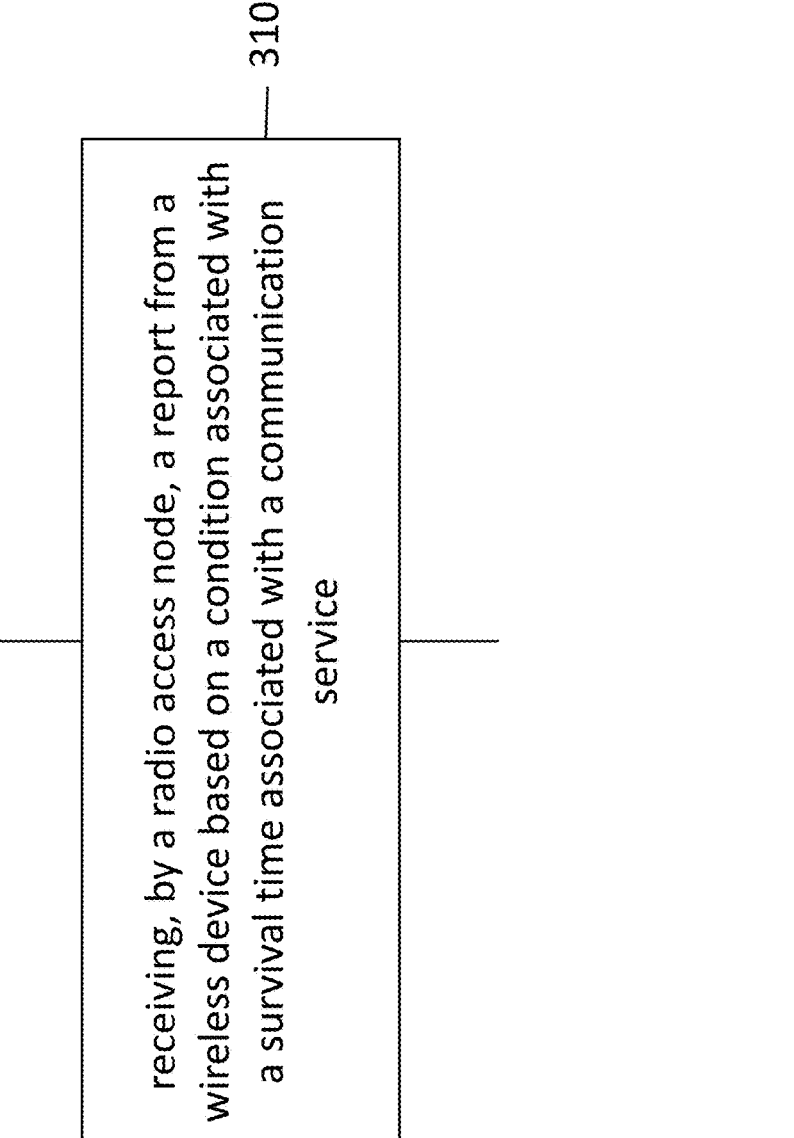
FIG. 3 is a flowchart of another method for wireless communication in accordance with one or more embodiments of the present technology.

FIG. 3 is a flowchart of a method for wireless communication 300 in accordance with one or more embodiments of the present technology. The method 300 includes, at operation 310, receiving, by a radio access node, a report from a wireless device based on a condition associated with a survival time associated with a communication service. The survival time represents an amount of time an application consuming the communication service is capable of continuing without receiving any anticipated message. The survival time can indicate a number of consecutive incorrectly received or lost packets.

In some embodiments, the survival time is determined based on a Packet Delay Budget (PDB) associated with the radio access node, which will be discussed in detail in Embodiments 2 and 3. Here, the PDB indicates an upper limit of a delay suffered by a packet. In some embodiments, the survival time is determined based on a packet retransmitted up to a maximum number of retransmissions, which will be discussed in detail in Embodiments 4 and 5.

In some embodiments, the report comprises information at least one of: a service quality improvement indicator associated with the survival time, a performance index associated with the survival time, a status indication associated with the survival time, a counter value associated with the survival time, a service identifier for the communication service, a request associated with the survival time, a message associated with the survival time, or a timer value associated with the survival time. In some embodiments, the method includes forwarding, by the radio access node, configuration information about the survival time from a network node to the wireless device (e.g., as will be discussed in detail in Embodiment 1).

In some embodiments, the method includes transmitting, by the radio access node, a reconfiguration indication to the wireless device to reconfigure a current connection between the wireless device and the radio access node (e.g., as will be discussed in detail in Embodiment 6).

In some embodiments, the method includes transmitting, from the radio access node, a threshold associated with the survival time to the wireless device. In some embodiments, the method includes triggering, by the radio access node, an activation of a Packet Data Convergence Protocol (PDCP) Duplication process based on the condition associated with the survival time. In some embodiments, the method includes triggering, by the wireless device, an activation of a PDCP Duplication process based on the condition associated with the survival time. These features will be discussed in detail in Embodiment 8.

In some embodiments, the method includes transmitting, by the radio access node, a switching indication to the wireless device to switch from a current logical channel to a second logical channel having a different priority. In some embodiments, the method includes transmitting, by the radio access node prior to transmitting the switching indication, information about the current logical channel and the second logical channel to the wireless device. In some embodiments, the method includes transmitting, by the radio access node, a switching indication to the wireless device to switch from a first priority to a second priority of a current logical channel. In some embodiments, the method includes transmitting, by the radio access node prior to transmitting the switching indication, information about multiple priorities of the current logical channel to the wireless device. The switching indication/procedure is further described in Embodiments 9 and 10.

Embodiment 1

To inform the mobile devices of the survival time, the Access and Mobility Management Function (AMF) in the 5G core network can use Non-Access-Stratum (NAS) Protocol Data Unit (PDU) in NAS signaling transmitted via the access node/the base station. The NAS signaling includes at least one of: PDU SESSION RESOURCE SETUP REQUEST, PDU SESSION RESOURCE RELEASE COMMAND, PDU SESSION RESOURCE MODIFY REQUEST, INITIAL CONTEXT SETUP REQUEST, HANDOVER REQUEST, INITIAL UE MESSAGE, or DOWNLINK NAS TRANSPORT. To inform the access nodes/base stations of the survival time, the AMF can also include the survival time in Time Sensitive Communication Assistance Information (TSCAI). Table 1 shows an example TSCAI information element (IE) that provides assistance information for a TSC QoS flow in the uplink or downlink direction.

TABLE 1

| Example TSCAI | |
| --- | --- |
| IE/Group Name | Presence |
| Periodicity | M |
| Burst Arrival Time | O |
| Survival Time | O |

In periodic communications, data packets may not be transmitted in every transmission period/cycle. It is thus desirable to indicate whether there is data transmission in each transmission cycle to reduce overhead in keeping track of survival time. For example, the packet header can include an indicator (e.g., 1 bit) indicating whether there is any data packet in the next transmission period. The access node(s) or base station(s) can skip operations of timer or counter related to the survival time if no data packet is to be transmitted. In some embodiments, if the packet to be sent is not received in every transmission cycle, operations of timer or counter related to lifetime is skipped by default. In some embodiments, the UE can send empty packets to indicate that there is no uplink data for transmission (e.g., in the uplink transmission of measurement statistics).

Embodiment 2

Figure 4:
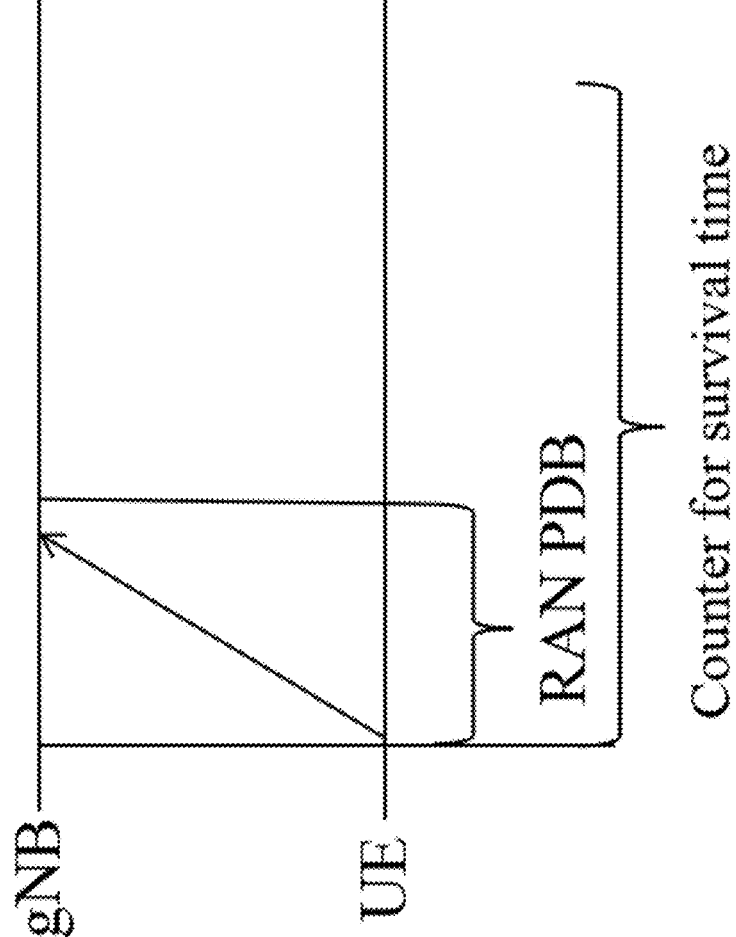
FIG. 4 illustrates an example scenario in which the Packet Delay Budget (PDB) is used in conjunction with the survival time in accordance with one or more embodiments of the present application.

In some embodiments, the survival time can be used in conjunction with the Packet Delay Budget (PDB). FIG. 4 illustrates an example scenario 400 in which the PDB is used in conjunction with the survival time in accordance with one or more embodiments of the present application. In this embodiment, the survival time can be implemented as a counter to track the number of unsuccessful transmissions. When a data packet is transmitted either in the uplink direction (e.g., from a mobile device to a base station/an access communication node) or downlink direction (e.g., from a base station/an access communication node to a mobile device), a PDB timer is used to determine whether the packet is successfully transmitted. The survival time counter is used in conjunction with the PDB timer to determine if certain packet loss(es) can be deemed tolerable given the relaxed QoS reliability requirement. Example operations that can be performed by the access communication node/base station are described below. Note that FIG. 4 depicts uplink transmission from the User Equipment (UE)/mobile device to the gNB/base station, but the operations are similarly applicable to downlink transmissions.

Operation 201: After data in the QoS flow reaches the UE, the UE starts a timer for a Radio Access Node (RAN) PDB, which can be configured by the gNB. The value of RAN PDB can be the difference between a reference PDB and Core Network (CN) PDB.

Operation 202a: If the packet is transmitted successfully before the RAN PDB timer expires, the UE can reset the timer of RAN PDB as well as the counter of survival time.

Operation 202b: If the packet is not transmitted successfully and the RAN PDB timer expires, the UE can increment the survival time counter by one and reset the RAN PDB timer.

Operation 203: If the survival time counter reaches or exceeds a maximum threshold, the survival time counter is reset by the UE.

In addition to the operations described above, the UE can trigger reporting of the measurement results based on the survival time counters. In some embodiments, each time the survival time counter is incremented (e.g., in Operation 202b), the UE triggers a measurement report. In some embodiments, the UE can be configured with an additional threshold. When the survival time counter reaches or exceeds the threshold, the UE triggers a measurement report. For example, the UE is configured with an additional threshold Tx=5. When the survival time counter has a value between [0, 4], no measurement report is triggered. When the survival time counter reaches 5, the UE triggers a measurement report. In some embodiments, the UE can start triggering measurement reports each time the survival time counter is incremented subsequently (e.g., value of the survival time is changed to 6, 7, 8, . . . ). Alternatively, the UE does not trigger any more measurement reports until another triggering condition is satisfied. For example, the UE can trigger measurement reports when the survival time counter reaches or exceeds the maximum threshold (e.g., in Operation 203).

Embodiment 3

Figure 5:
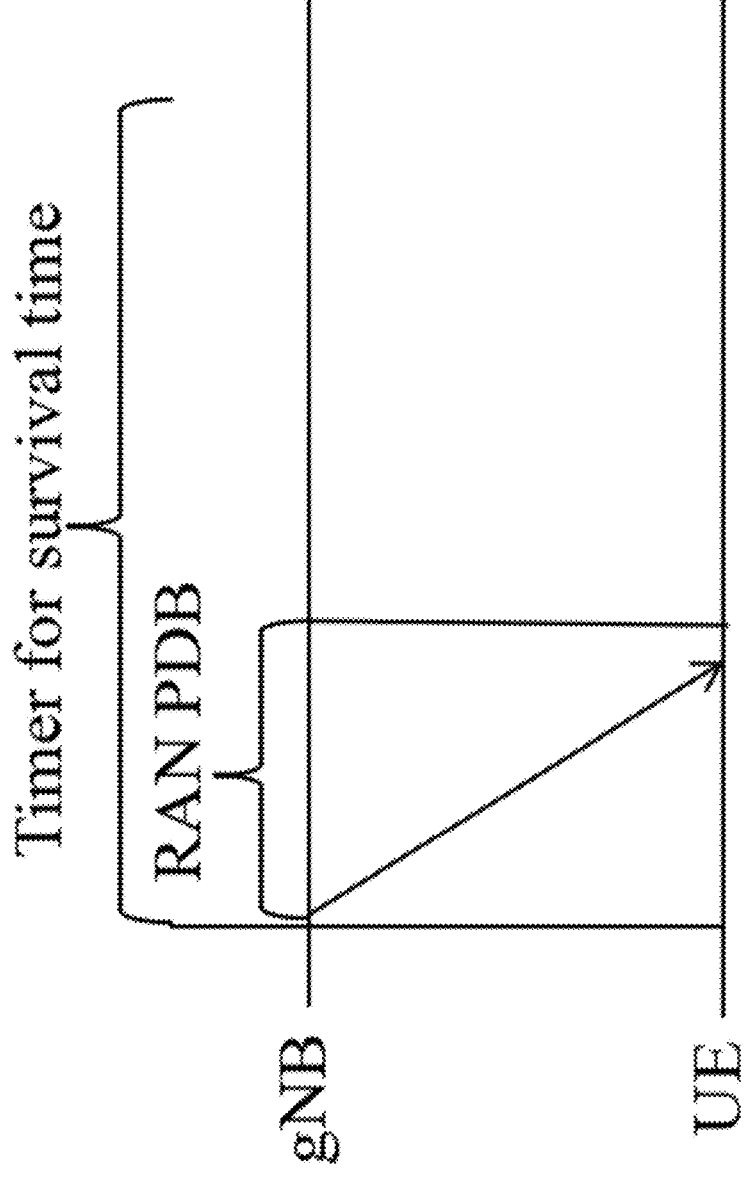
FIG. 5 illustrates another example scenario in which the PDB is used in conjunction with the survival time in accordance with one or more embodiments of the present application.

FIG. 5 illustrates another example scenario 500 in which the PDB is used in conjunction with the survival time in accordance with one or more embodiments of the present application. In this embodiment, the survival time can be implemented as a timer. When a data packet is transmitted either in the uplink direction (e.g., from a mobile device to a base station/an access communication node) or downlink direction (e.g., from a base station/an access communication node to a mobile device), a PDB timer is used to determine whether the packet is successfully transmitted. The survival time timer is used in conjunction with the PDB timer to determine if certain packet loss(es) can be deemed tolerable given the relaxed QoS reliability requirement. Example operations that can be performed by the access communication node/base station are described below. Note that FIG. 5 depicts downlink transmission from the gNB/base station to the User Equipment (UE)/mobile device, but the operations are similarly applicable to uplink transmissions.

Operation 301: After the data from the QoS flow reaches the gNB, the gNB starts the RAN PDB timer and the survival time timer. The survival time timer expires at a preconfigured or predetermined time limit (e.g., in the unit of frame, subframe, or millisecond) that is related to the communication cycle.

Operation 302*a*: If the packet is transmitted successfully before the RAN PDB timer expires, the UE can reset both timers: the RAN PDB timer as well as the survival time timer.

Operation 302*b*: If the packet is not transmitted successfully and the RAN PDB timer expires, the UE can reset the RAN PDB timer. The survival time timer is not reset and continue to keep track of the time.

Operation 303: If the survival time timer expires (e.g., reaches the preconfigured or predetermined time limit), the survival time counter is reset by the gNB.

In addition to the operations described above, the gNB can trigger the UE to report measurement results based on the survival time timer. In some embodiments, the gNB can configure an additional threshold for the survival time timer. When the survival time timer reaches or exceeds the additional threshold, a measurement report is triggered accordingly. Alternatively, and in addition, measurement reports can be triggered when the survival time timer reaches or exceeds the preconfigured or predetermined time limit (e.g., in Operation 303).

Embodiment 4

Figure 6:
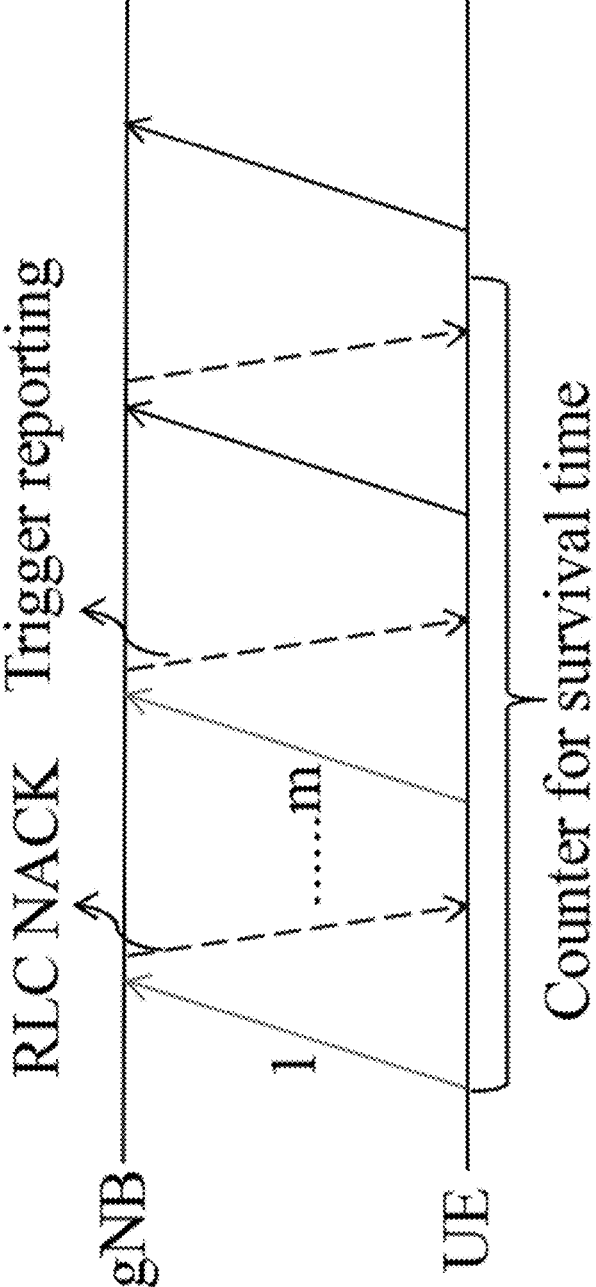
FIG. 6 illustrates an example scenario in which the Radio Link Control (RLC) Negative-Acknowledgement (NACK) is used in conjunction with the survival time in accordance with one or more embodiments of the present application.

In some embodiments, the survival time can be used in conjunction with negative-acknowledgments (NACKs) in Radio Link Control (RLC) layer. FIG. 6 illustrates an example scenario 600 in which the RLC NACK is used in conjunction with the survival time in accordance with one or more embodiments of the present application. In this embodiment, the survival time can be implemented as a counter to track the number of unsuccessful transmissions.

One of the most important features of RLC Acknowledgement Mode (AM) is the polling mechanism for reliable data traffic. The transmitter side sends a pool request, and the receiver side reports its status carrying ACK, NACK etc.

The survival time counter is used in conjunction with the NACK messages (e.g., the pooling mechanism) to determine if certain packet loss(es) can be deemed tolerable given the relaxed QoS reliability requirement. Example operations that can be performed by the access communication node/base station are described below. Note that FIG. 6 depicts uplink transmission from the User Equipment (UE)/mobile device to the gNB/base station, but the operations are similarly applicable to downlink transmissions.

Operation 401: The UE transmits a data packet to the gNB.

Operation 402*a*: If the UE receives an ACK message that includes the corresponding serial number (SN), the UE can reset the survival time counter.

Operation 402*b*: If the UE receives a NACK message from the gNB with the corresponding SN, the UE continues to send the polling bit in the next packet and increments the survival time counter.

Operation 403: If the survival time counter reaches or exceeds a maximum threshold, the survival time counter is reset by the UE.

In addition to the operations described above, the UE can trigger reporting of the measurement results based on the survival time counter. In some embodiments, each time the survival time counter is incremented (e.g., in Operation 402*b*), the UE triggers a measurement report. In some embodiments, the UE can be configured with an additional threshold. When the survival time counter reaches or exceeds the threshold, the UE triggers a measurement report. For example, the UE is configured with an additional threshold Tx=5. When the survival time counter has a value between [0, 4], no measurement report is triggered. When the survival time counter reaches 5, the UE triggers a measurement report. In some embodiments, the UE can start triggering measurement reports each time the survival time counter is subsequently incremented (e.g., value of the survival time is changed to 6, 7, 8, . . . ). Alternatively, the UE does not trigger any more measurement reports until another triggering condition is satisfied. For example, the UE can trigger measurement reports when the survival time counter reaches or exceeds the maximum threshold (e.g., in Operation 403).

Embodiment 5

Figure 7:
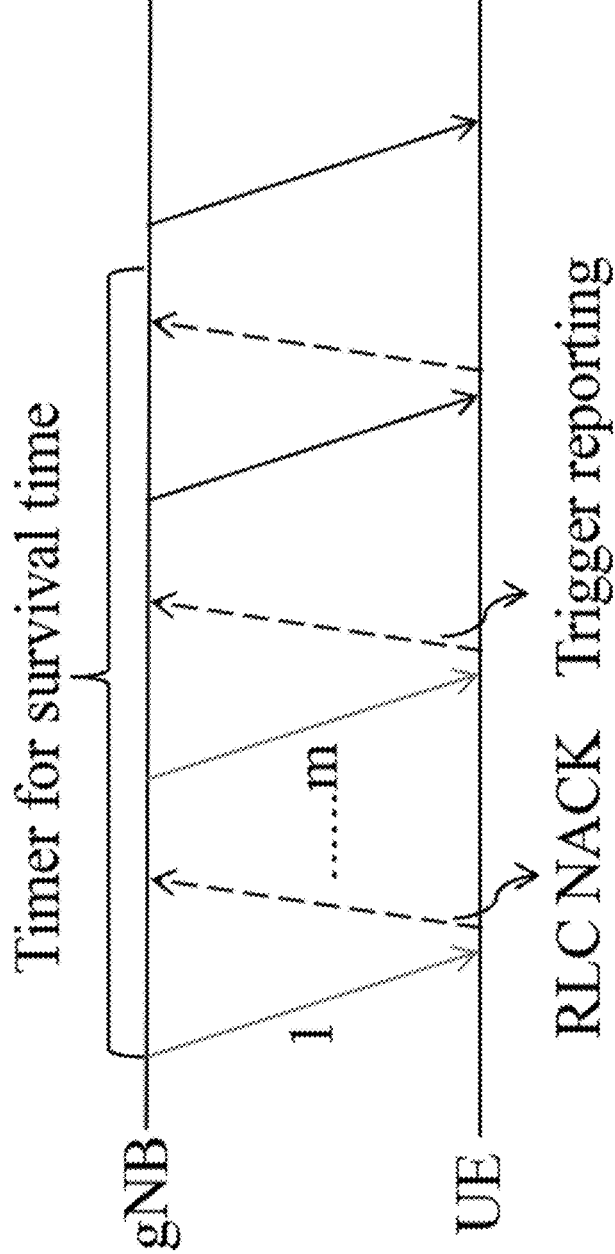
FIG. 7 illustrates another example scenario in which the RLC NACK is used in conjunction with the survival time in accordance with one or more embodiments of the present application.

FIG. 7 illustrates an example scenario 700 in which the RLC NACK is used together with the survival time in accordance with one or more embodiments of the present application. In this embodiment, the survival time can be implemented as a timer. The survival time timer is used in conjunction with the NACK messages (e.g., the pooling mechanism) to determine if certain packet loss(es) can be deemed tolerable given the relaxed QoS reliability requirement. Example operations that can be performed by the access communication node/base station are described below. Note that FIG. 7 depicts downlink transmissions from the gNB/base station to the User Equipment (UE)/mobile device, but the operations are similarly applicable to uplink transmissions.

Operation 501: The gNB transmits a data packet to the UE and starts the survival time timer. The survival time timer expires at a preconfigured or predetermined time limit (e.g., in the unit of frame, subframe, or millisecond) that is related to the communication cycle.

Operation 502*a*: If the gNB receives an ACK message that includes the corresponding serial number (SN), the gNB can reset the survival time timer.

Operation 502*b*: If the gNB receives a NACK message from the UE with the corresponding SN, the gNB continues to send the polling bit in the next packet. The survival time timer is not reset and continue to keep track of the time.

Operation 503: If the survival time timer expires (e.g., reaches the preconfigured or predetermined time limit), the survival time counter is reset by the gNB.

In addition to the operations described above, the gNB can trigger the UE to report measurement results based on the survival time timer. In some embodiments, the gNB can configure an additional threshold for the survival time timer. When the survival time timer reaches or exceeds the additional threshold, a measurement report is triggered accordingly. Alternatively, and in addition, measurement reports can be triggered when the survival time timer reaches or exceeds the preconfigured or predetermined time limit (e.g., in Operation 503).

Embodiment 6

Figure 8:
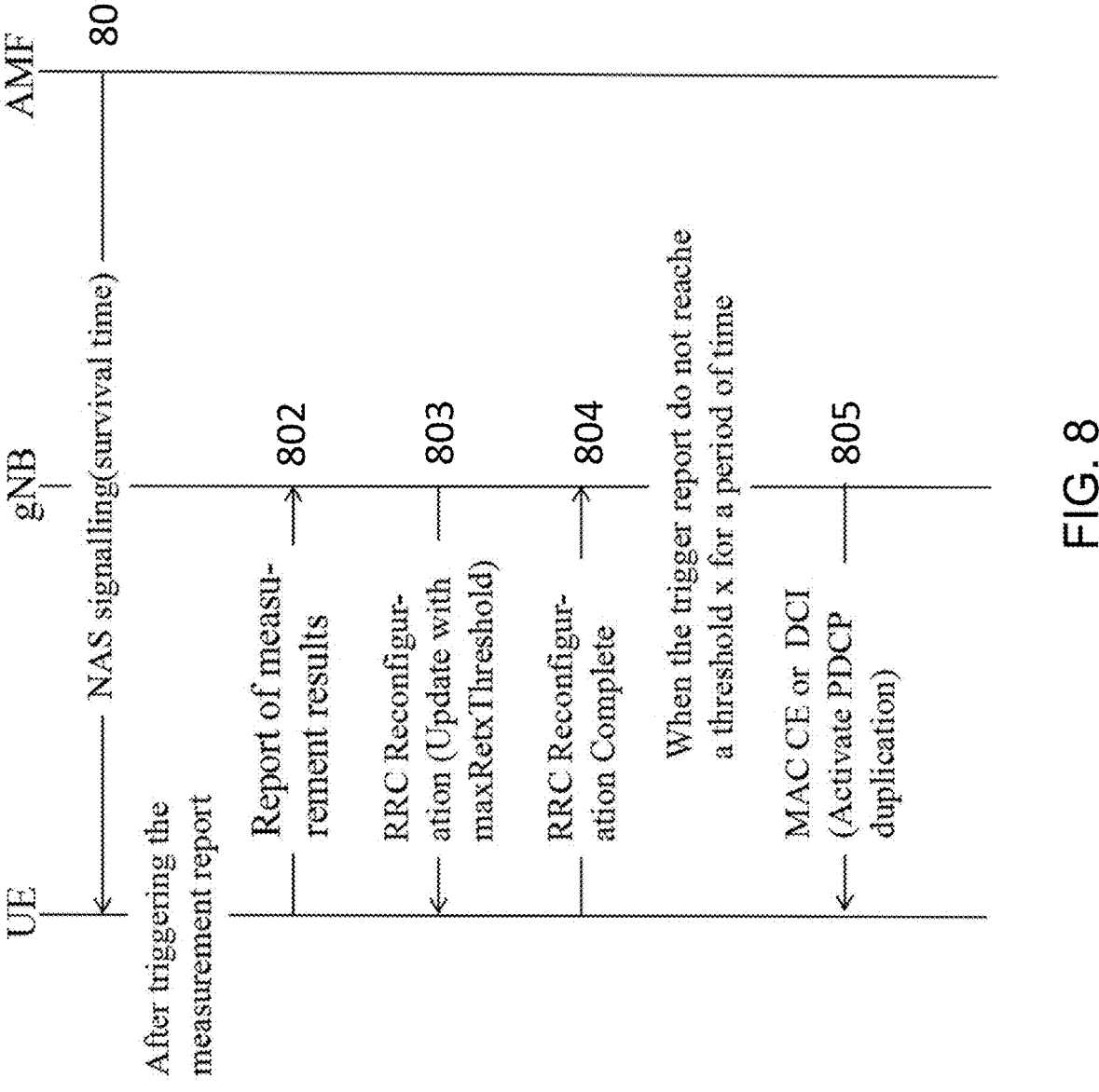
FIG. 8 illustrates an example signaling sequence for uplink packet transmissions in accordance with one or more embodiments of the present technology.

As discussed in Embodiments 2-5, measurement reports from the UE to the gNB can be triggered when certain conditions with respective the survival time are satisfied. Furthermore, based on the measurements reports, the gNB can initiate changes to the current connection, such as Radio Resource Control (RRC) reconfiguration or activation/deactivation of Packet Data Convergence Protocol (PDCP) duplication function. FIG. 8 illustrates an example signaling sequence 800 for uplink packet transmissions in accordance with one or more embodiments of the present technology.

Operation 801: The AMF can inform the UE of the survival time in a NAS signaling (e.g., as described in Embodiment 1). For example, a maximum upper limit of the survival time (either in the form of a counter or a timer) can be transmitted to the UE.

Operation 802: Based on the actual transmissions, the UE can trigger a measurement report to the gNB (e.g., as described in Embodiments 2-5). The measurement report cam include at least one of the following: a service quality improvement indicator associated with the survival time, a performance index associated with the survival time, a status indication associated with the survival time, a counter value associated with the survival time, a service identifier for the communication service, a request associated with the survival time, a message associated with the survival time, or a timer value associated with the survival time.

In some embodiments, the measurement report(s) can be included in the Uplink Control Indication (UCI) carried on either the Physical Uplink Control Channel (PUCCH) or Physical Uplink Shared Channel (PUSCH). In some embodiments, a logical channel identifier (LCID) can be reserved in the Medium Access Control (MAC) Control Element (CE) that is carried in the Uplink Shared Channel (ULSCH). In some embodiments, the measurement results can be included in an RRC message, such as RRCSystem-InfoRequest, RRCSetupRequest, RRCResumeRequest, RRCResumeRequest1, or RRCReestablishmentRequest.

Operation 803: After the gNB receives the measurement report from the UE, the gNB can initiate an RRC reconfiguration process by sending an RRC reconfiguration request. The reconfiguration request can further update the maximum retransmission number of RLC (e.g., maxRetx-Threshold) and/or activate PDCP duplication function.

Operation 804: The UE sends a response message to the gNB indicating the completion of the reconfiguration.

Operation 805: After the UE completes the reconfiguration, the UE can continue to send measurement reports based on the conditions of subsequent communications (e.g., as discussed in Embodiments 2-5). In some embodiments, the gNB can start a timer to track the amount of measurement reports from the UE to determine further actions. For example, if the number of triggered measurement reports is less than a threshold when the timer expires and the channel quality indication reported by the UE is greater than another threshold, the gNB can activate the PDCP duplication function via either MAC layer (e.g., MAC CE) or the physical layer (e.g., DCI signaling). For example, indication of activation of the PDCP duplication function can be sent using Semi-Persistent Scheduling (SPS) or Configured Grant (CG) configuration information.

Embodiment 7

Figure 9:
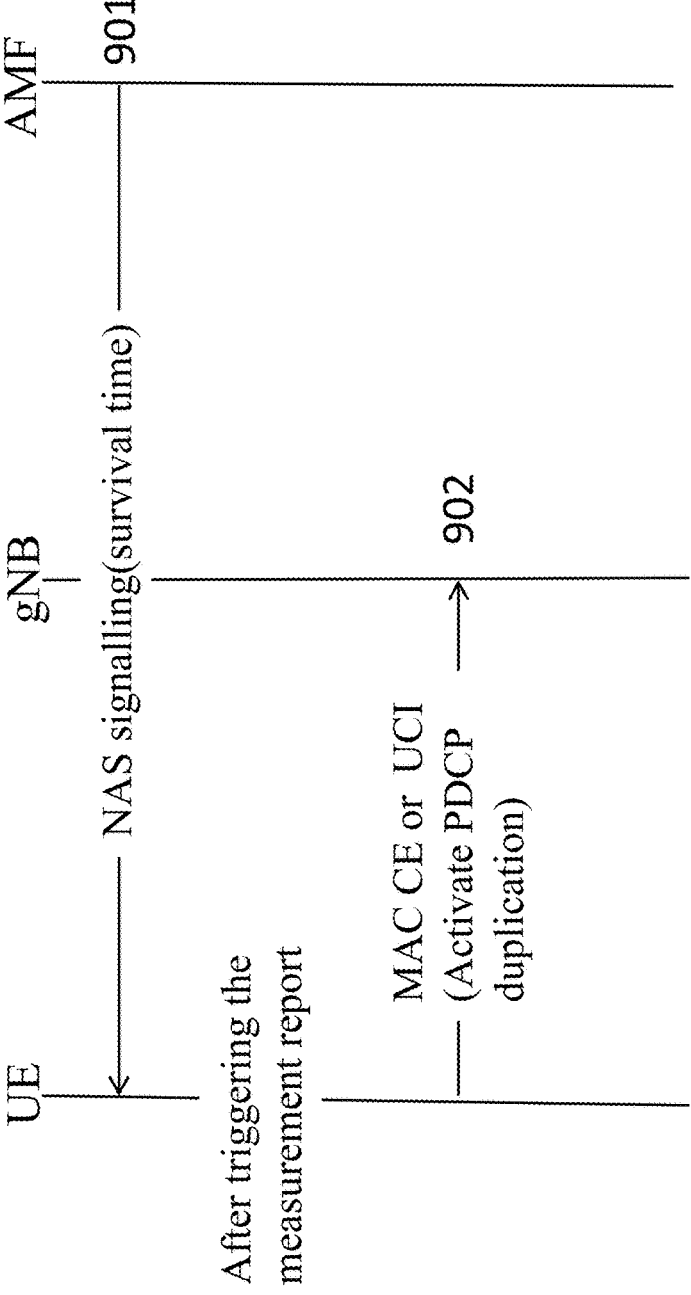
FIG. 9 illustrates an example signaling sequence for uplink packet transmissions in accordance with one or more embodiments of the present technology.

FIG. 9 illustrates an example signaling sequence 900 for uplink packet transmissions in accordance with one or more embodiments of the present technology.

Operation 901: The AMF can inform the UE of the survival time in a NAS signaling (e.g., as described in Embodiment 1). For example, a maximum upper limit of the survival time (either in the form of a counter or a timer) can be transmitted to the UE.

Operation 902: Measurement reports can be triggered based on the transmission conditions (e.g., as discussed in Embodiments 2-5). Based on the measurement reports, the UE activate Packet Data Convergence Protocol (PDCP) duplication function. For example, the UE can activate the PDCP duplication function via either MAC layer (e.g., MAC CE) or the physical layer (e.g., UCI signaling).

Embodiment 8

Figure 10:
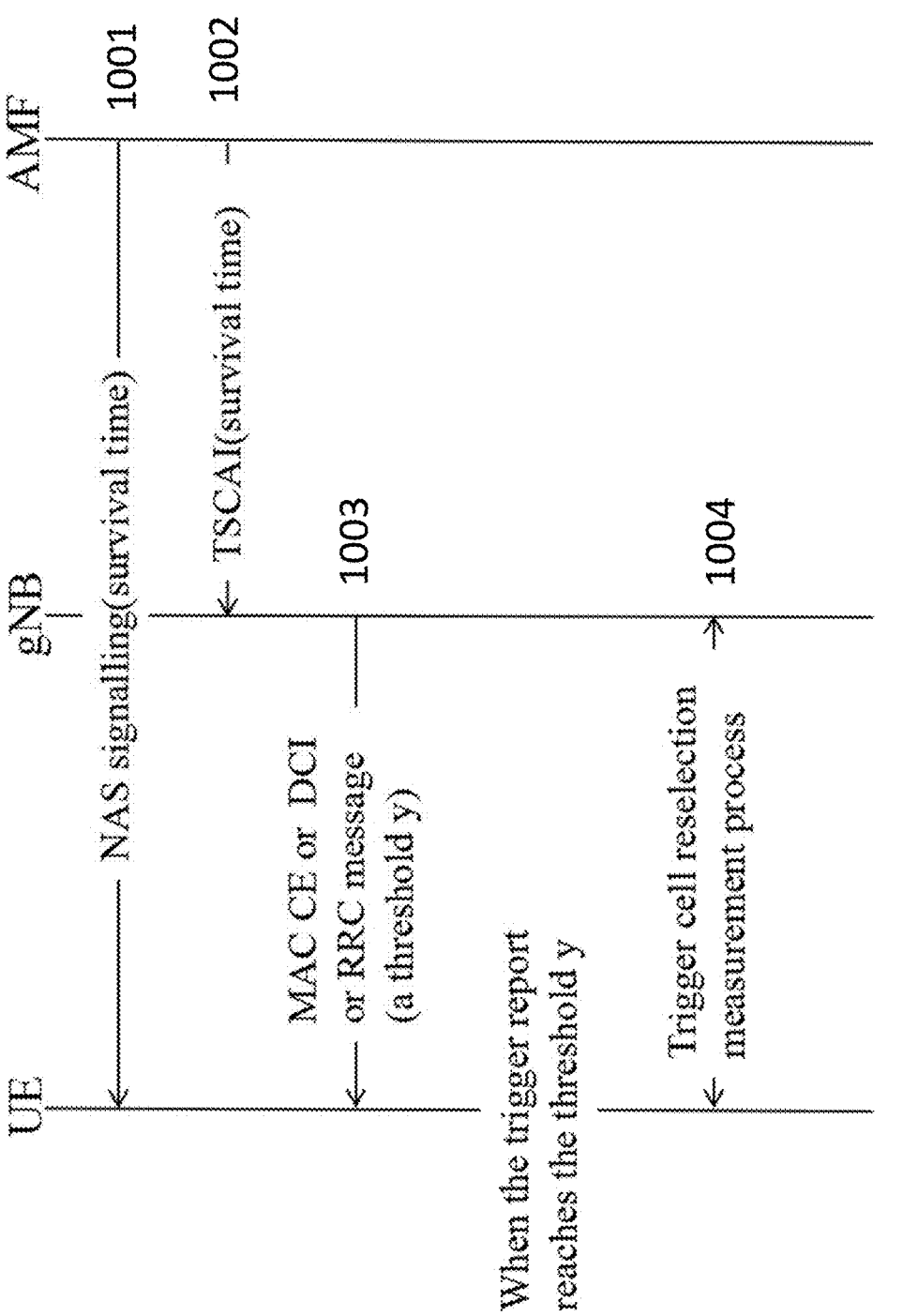
FIG. 10 illustrates an example signaling sequence for cell reselection in accordance with one or more embodiments of the present technology.

As discussed in Embodiments 2-7, additional thresholds can be configured to enable the UE and/or the gNB to trigger measurement reports or perform subsequent actions such as RRC reconfiguration or PDCP duplication activation/deactivation. The gNB can send the threshold information to the UE via RRC, MAC, or DCI signaling messages. In some embodiments, the threshold information can enable the UE to initiate a cell resection procedure or a PDCD duplication process by itself. FIG. 10 illustrates an example signaling sequence 1000 for cell reselection in accordance with one or more embodiments of the present technology.

Operation 1001: The AMF can inform the UE of the survival time in a NAS signaling (e.g., as described in Embodiment 1). For example, a maximum upper limit of the survival time (either in the form of a counter or a timer) can be transmitted to the UE.

Operation 1002: The AMF can also inform the gNB of the survival time in a TSCAI (e.g., as described in Embodiment 1). The maximum upper limit of the survival time (either in the form of a counter or a timer) can be transmitted to the gNB.

Operation 1003: The gNB configures the threshold(s) and sends the threshold(s) to UE via RRC, MAC, or DCI messages. The threshold(s) can include a threshold for a counter, a threshold for a timer, and/or a threshold for the number of measurement reports for triggering an RRC reconfiguration, a cell reselection, or a PDCP duplication. In some embodiments, the threshold(s) can be included in at least one of the following RRC messages: RRCReestablishment, RRCReconfiguration, RRCResume, RRCReject, RRCSetup. In some embodiments, the threshold(s) can be included in a logical channel identifier (LCD) that is reserved in the Medium Access Control (MAC) Control Element (CE).

Operation 1004: Subsequently, the UE can be triggered to send measurement reports to the gNB based on the transmission conditions (e.g., as discussed in Embodiments 2-5). In some embodiments, if the UE has been configured with a threshold indicating the number of measurement reports for triggering a cell reselection procedure, the UE is triggered to measure the cell attributes so as to start the cell reselection process.

In some embodiments, if the UE has been configured with a threshold indicating the number of measurement reports for triggering a PDCP duplication process, the UE is triggered to activate the PDCP duplication process when the threshold is met or exceeded.

Embodiment 9

Figure 11:
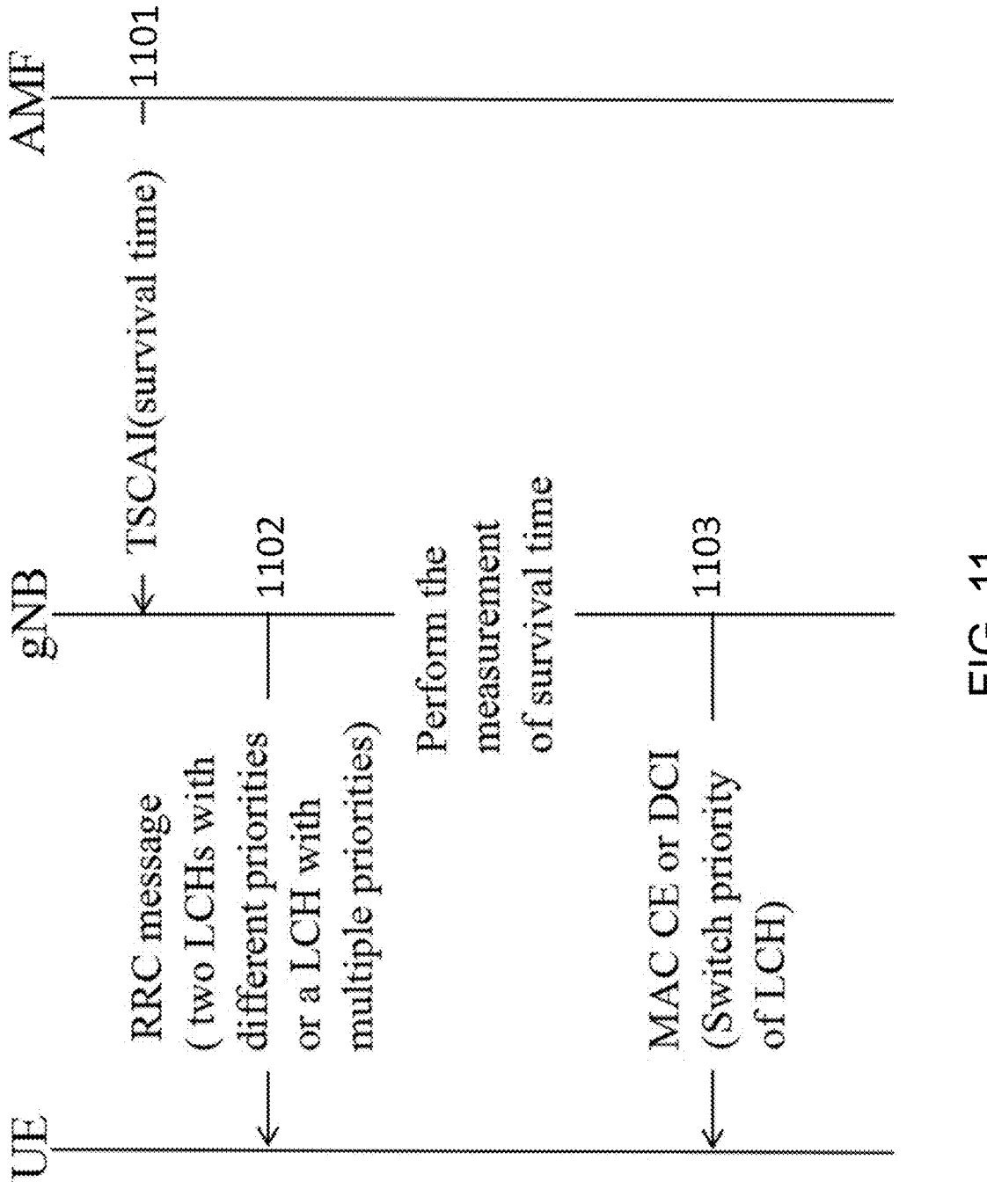
FIG. 11 illustrates an example signaling sequence for logical channel switching in accordance with one or more embodiments of the present technology.

In some embodiments, based on the measurements results received from the mobile device/UE, the access node/base station can instruct the mobile device/UE to switch to a different logical channel or switch to a different priority in the same logical channel. FIG. 11 illustrates an example signaling sequence 1100 for logical channel switching in accordance with one or more embodiments of the present technology.

Operation 1101: The AMF can inform the gNB of the survival time in a TSCAI (e.g., as described in Embodiment 1). For example, a maximum upper limit of the survival time (either in the form of a counter or a timer) can be transmitted to the gNB.

Operation 1102: The gNB configures two LCHs with different priority or a LCH with multiple priorities for UE through RRC message. In this example, the UE initially chooses to send uplink packet on LCH with low priority.

Operation 1103: The gNB determines whether the packets sent by UE are successful based on Cell Group timing and uplink energy detection configured for UE. When the survival time is about to time out, the gNB can instruct the UE to switch to the high priority LCH to send uplink packets in an indication. The indication can be carried in a MAC CE or a DCI signaling.

In some embodiments, the gNB can instruct the UE to switch to a different priority in the same LCH for subsequent uplink transmissions.

Embodiment 10

Figure 12:
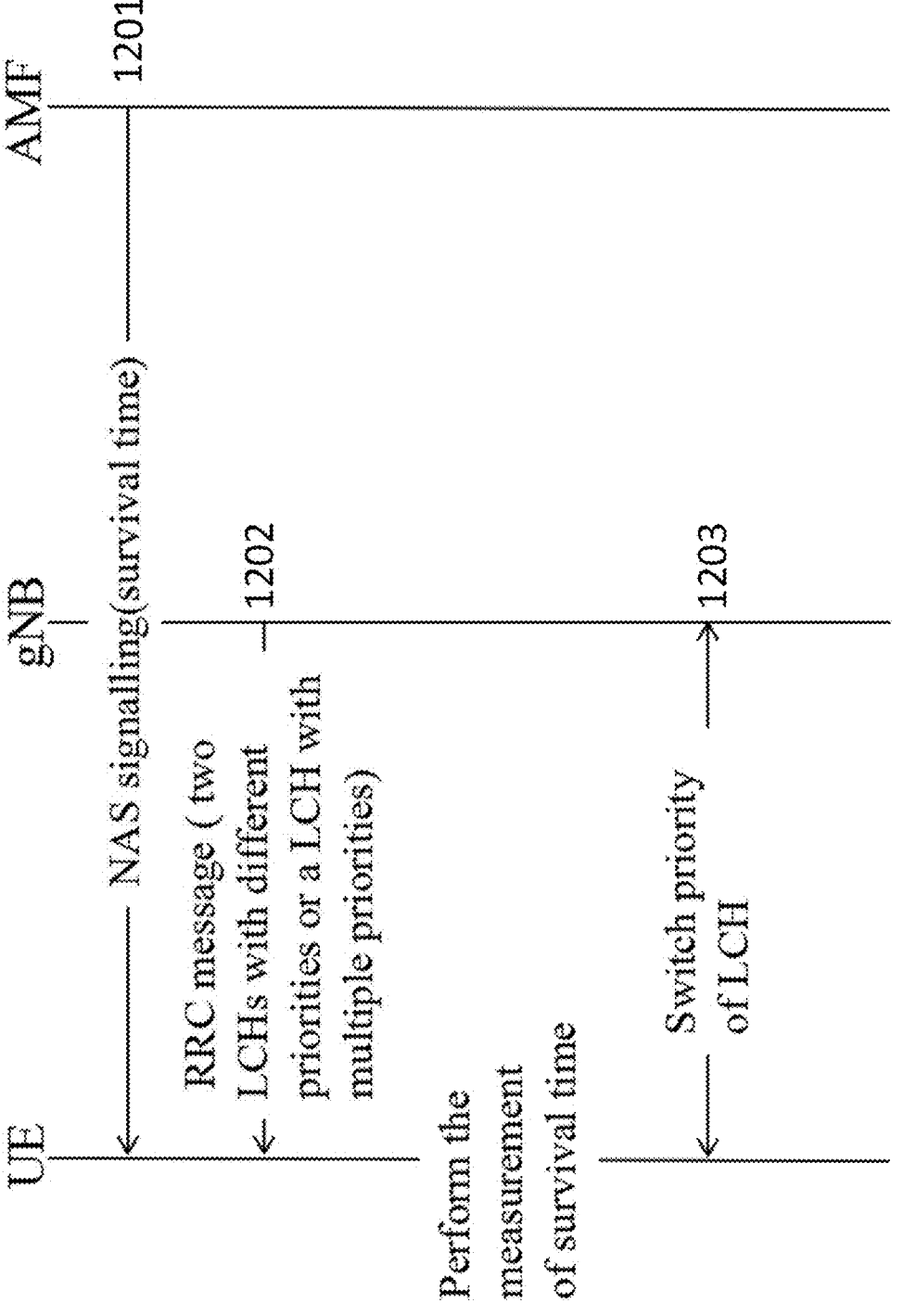
FIG. 12 illustrates another example signaling sequence for logical channel switching in accordance with one or more embodiments of the present technology.

FIG. 12 illustrates another example signaling sequence 1200 for logical channel switching in accordance with one or more embodiments of the present technology.

Operation 1201: The AMF can inform the UE of the survival time in a NAS signaling (e.g., as described in Embodiment 1). For example, a maximum upper limit of the survival time (either in the form of a counter or a timer) can be transmitted to the UE.

Operation 1202: Before the measurement of the survival time, the gNB configures two LCHs with different priority or a LCH with multiple priorities for UE through RRC message. In this example, the UE initially chooses to send uplink packet on LCH with low priority.

Operation 1203: The UE transmits measurement reports upon certain conditions associated with the survival time are satisfied (e.g., as discussed in Embodiments 2-5). Based on the measurement reports, the UE can initiate the logical channel switching operation on its own (e.g., switching from low priority channel to high priority channel). Alternatively, the gNB can instruct the UE to switch to the high priority LCH to send uplink packets in an indication. The indication can be carried in a MAC CE or a DCI signaling.

Figure 13:
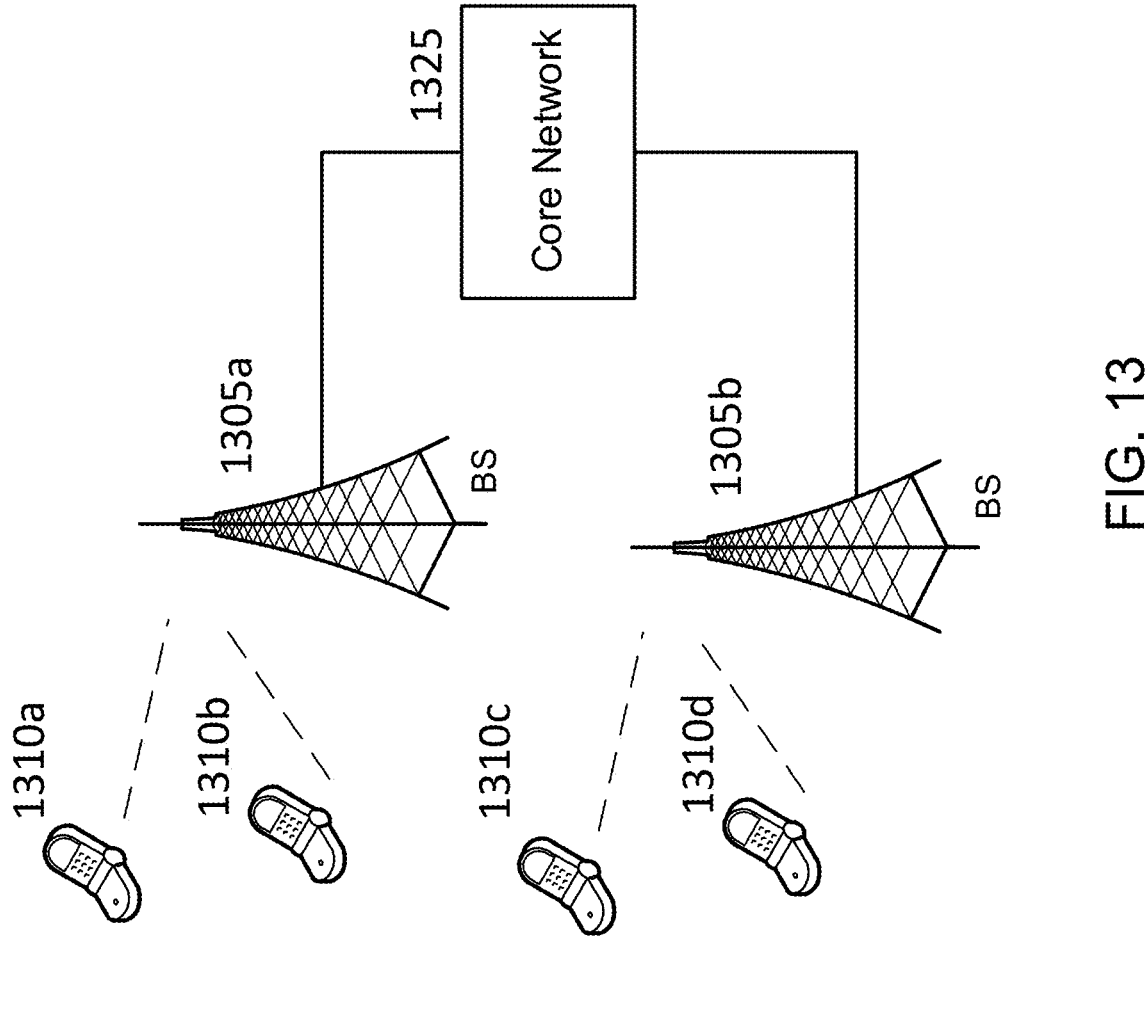
FIG. 13 shows an example of a wireless communication system where techniques in accordance with one or more embodiments of the present technology can be applied.
Figure 13:
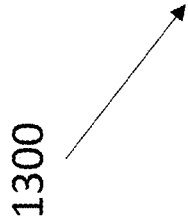

FIG. 13 shows an example of a wireless communication system 1300 where techniques in accordance with one or more embodiments of the present technology can be applied. A wireless communication system 1200 can include one or more base stations (BSs) 1305*a*, 1305*b*, one or more wireless devices 1310*a*, 1310*b*, 1310*c*, 1310*d*, and a core network 1325. A base station 1305*a*, 1305*b* can provide wireless service to wireless devices 1310*a*, 1310*b*, 1310*c* and 1310*d* in one or more wireless sectors. In some implementations, a base station 1305*a*, 1305*b* includes directional antennas to produce two or more directional beams to provide wireless coverage in different sectors.

The core network 1325 can communicate with one or more base stations 1305*a*, 1305*b*. The core network 1325 provides connectivity with other wireless communication systems and wired communication systems. The core network may include one or more service subscription databases to store information related to the subscribed wireless devices 1310*a*, 1310*b*, 1310*c*, and 1310*d*. A first base station 1305*a* can provide wireless service based on a first radio access technology, whereas a second base station 1305*b* can provide wireless service based on a second radio access technology. The base stations 1305*a* and 1305*b* may be co-located or may be separately installed in the field according to the deployment scenario. The wireless devices 1310*a*, 1310*b*, 1310*c*, and 1310*d* can support multiple different radio access technologies. The techniques and embodiments described in the present document may be implemented by the base stations of wireless devices described in the present document.

Figure 14:
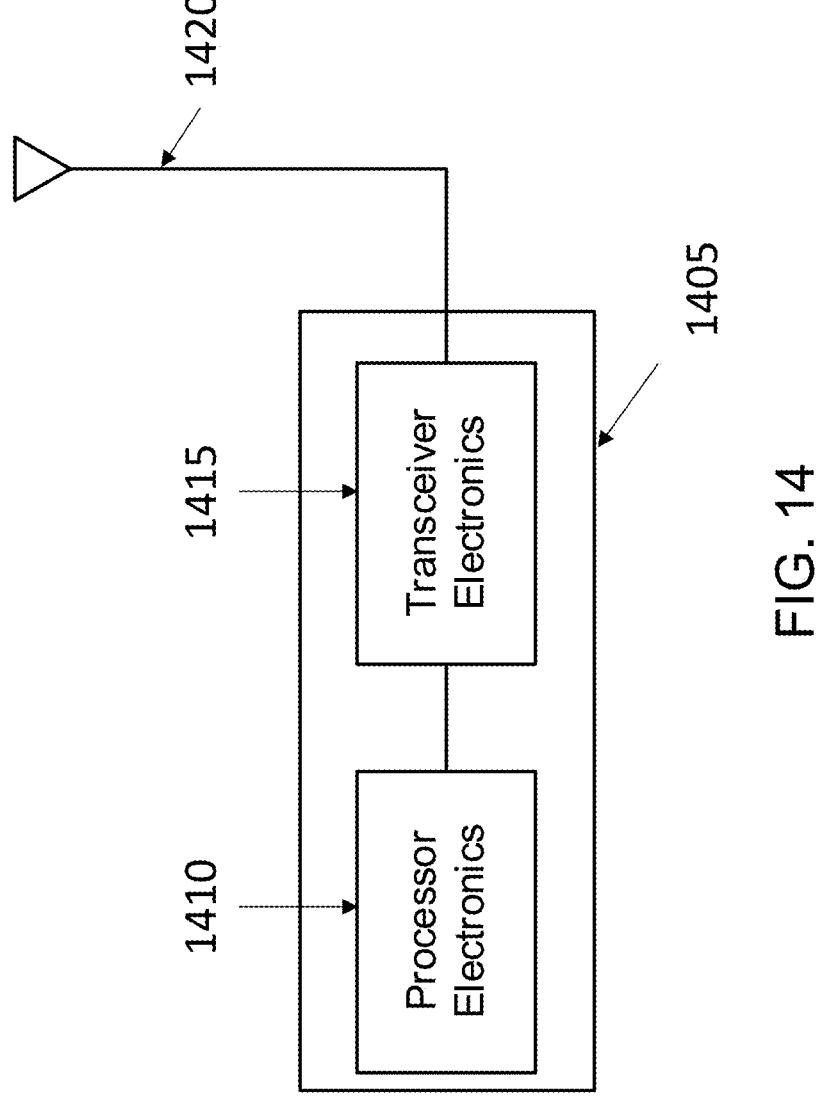
FIG. 14 is a block diagram representation of a portion of a radio station in accordance with one or more embodiments of the present technology can be applied.

FIG. 14 is a block diagram representation of a portion of a radio station in accordance with one or more embodiments of the present technology can be applied. A radio station 1405 such as a base station or a wireless device (or wireless device) can include processor electronics 1410 such as a microprocessor that implements one or more of the wireless techniques presented in this document. The radio station 1405 can include transceiver electronics 1415 to send and/or receive wireless signals over one or more communication interfaces such as antenna 1420. The radio station 1405 can include other communication interfaces for transmitting and receiving data. Radio station 1405 can include one or more memories (not explicitly shown) configured to store information such as data and/or instructions. In some implementations, the processor electronics 1410 can include at least a portion of the transceiver electronics 1415. In some embodiments, at least some of the disclosed techniques, modules or functions are implemented using the radio station 1405. In some embodiments, the radio station 1405 may be configured to perform the methods described herein.

It will be appreciated that the present document discloses techniques that can be embodied in various embodiments to allow the access nodes/the base stations to perform efficient resource allocation based on relaxed QoS reliability requirement using the survival time parameter. The disclosed techniques also allow either the base station or the UE to initiate procedures (e.g., connection reconfiguration, cell reselection, or PDCP duplication) should the current connection fails to meet the relaxed QoS requirements as indicated by the survival time parameter. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a wireless device, a message from a radio access node, wherein the message forwards configuration information specifying a condition about a survival time associated with a communication service, wherein the survival time is received by the radio access node from an Access and Mobility Management Function (AMF) and is included in a Time Sensitive Communication Assistance Information (TSCAI) Information Element (IE), wherein the survival time represents an amount of time that an application of the communication service is capable of continuing without receiving any anticipated message, the survival time indicating a number of consecutive incorrectly received or lost packets;
   triggering, by the wireless device, a report to the radio access node based upon the condition of the survival time associated with the communication service being met; and
   triggering, by the wireless device based upon the condition being met, a cell reselection procedure or an activation of a Packet Data Convergence Protocol (PDCP) Duplication process.

2. The method of claim 1, wherein the report comprises at least one of: a service quality improvement indicator associated with the survival time, a performance index associated with the survival time, a status indication associated with the survival time, a counter value associated with the survival time, a service identifier for the communication service, a request associated with the survival time, a second message associated with the survival time, or a timer value associated with the survival time.

3. The method of claim 1, wherein the condition is met when a survival time counter reaches or exceeds a threshold.

4. The method of claim 3, wherein the threshold comprises at least one of: (1) a value of one, (2) a value defined by the wireless device, (3) an allowable number of consecutive packet losses, or (4) a percentage value.

5. The method of claim 1, comprising:

switching, by the wireless device, from a current logical channel having a first priority to a second logical channel having a second priority based on the condition associated with the survival time.

6. A method for wireless communication, comprising:

receiving, by a radio access node, Time Sensitive Communication Assistance Information (TSCAI) from an Access and Mobility Management Function (AMF), wherein the TSCAI comprises a survival time associated with a communication service included in an TSCAI Information Element (IE), wherein the survival time represents an amount of time that an application of the communication service is capable of continuing without receiving any anticipated message, the survival time indicating a number of consecutive incorrectly received or lost packets;

forwarding a message from the radio access node to a wireless device, wherein the message comprises configuration information about the survival time associated with the communication service, wherein the configuration information specifies a condition that enables the wireless device to autonomously trigger a cell reselection procedure or an activation of a Packet Data Convergence Protocol (PDCP) Duplication process in case the condition is met; and receiving, by the radio access node, a report from the wireless device based on the condition associated with the survival time associated with the communication service being met.

7. The method of claim 6, comprising:

transmitting, by the radio access node, a reconfiguration indication to the wireless device to reconfigure a current connection between the wireless device and the radio access node.

8. The method of claim 6, comprising:

transmitting, by the radio access node, a switching indication to the wireless device to switch from a current logical channel to a second logical channel having a different priority.

9. The method of claim 6, wherein the report comprises at least one of: a service quality improvement indicator associated with the survival time, a performance index associated with the survival time, a status indication associated with the survival time, a counter value associated with the survival time, a service identifier for the communication service, a request associated with the survival time, a second message associated with the survival time, or a timer value associated with the survival time.

10. The method of claim 6, wherein the condition is met when a survival time counter reaches or exceeds a threshold.

11. A communication apparatus, comprising at least one processor configured to:

receive, by the communication apparatus, a message from a radio access node, wherein the message forwards configuration information specifying a condition about a survival time associated with a communication service, wherein the survival time is received by the radio access node from an Access and Mobility Management Function (AMF) and is included in a Time Sensitive Communication Assistance Information (TSCAI) Information Element (IE), wherein the survival time represents an amount of time that an application of the communication service is capable of continuing without receiving any anticipated message, the survival time indicating a number of consecutive incorrectly received or lost packets; and trigger a report to the radio access node based upon the condition of the survival time associated with the communication service being met; and trigger, by the communication apparatus based upon the condition being met, a cell reselection procedure or an activation of a Packet Data Convergence Protocol (PDCP) Duplication process.

12. The apparatus of claim 11, wherein the report comprises at least one of: a service quality improvement indicator associated with the survival time, a performance index associated with the survival time, a status indication associated with the survival time, a counter value associated with the survival time, a service identifier for the communication service, a request associated with the survival time, a second message associated with the survival time, or a timer value associated with the survival time.

13. The apparatus of claim 11, wherein the condition is met when a survival time counter reaches or exceeds a threshold.

14. The apparatus of claim 13, wherein the threshold comprises at least one of: (1) a value of one, (2) a value defined by the apparatus, (3) an allowable number of consecutive packet losses, or (4) a percentage value.

15. The apparatus of claim 11, wherein the at least one processor is configured to:

switch from a current logical channel having a first priority to a second logical channel having a second priority based on the condition associated with the survival time.

16. A communication node, comprising at least one processor configured to:

receive, by the communication node, Time Sensitive Communication Assistance Information (TSCAI) from an Access and Mobility Management Function (AMF), wherein the TSCAI comprises a survival time associated with a communication service included in an TSCAI Information Element (IE), wherein the survival time represents an amount of time that an application of the communication service is capable of continuing without receiving any anticipated message, the survival time indicating a number of consecutive incorrectly received or lost packets;

forward a message from the communication node to a wireless device, wherein the message comprises configuration information about the survival time associated with the communication service, wherein the configuration information specifies a condition that enables the wireless device to autonomously trigger a cell reselection procedure or an activation of a Packet Data Convergence Protocol (PDCP) Duplication process in case the condition is met; and receive a report from the wireless device based on a condition associated with the survival time associated with the communication service being met.

17. The communication node of claim 16, wherein the at least one processor is configured to:

transmit a reconfiguration indication to the wireless device to reconfigure a current connection between the wireless device and the communication node.

18. The communication node of claim 16, wherein the at least one processor is configured to:

transmit a switching indication to the wireless device to switch from a current logical channel to a second logical channel having a different priority.

19. The communication node of claim 16, wherein the report comprises at least one of: a service quality improve- ment indicator associated with the survival time, a perfor- mance index associated with the survival time, a status indication associated with the survival time, a counter value associated with the survival time, a service identifier for the communication service, a request associated with the sur- vival time, a second message associated with the survival time, or a timer value associated with the survival time.

20. The communication node of claim 16, wherein the condition is met when a survival time counter reaches or exceeds a threshold.

* * * * *